Figure 8:
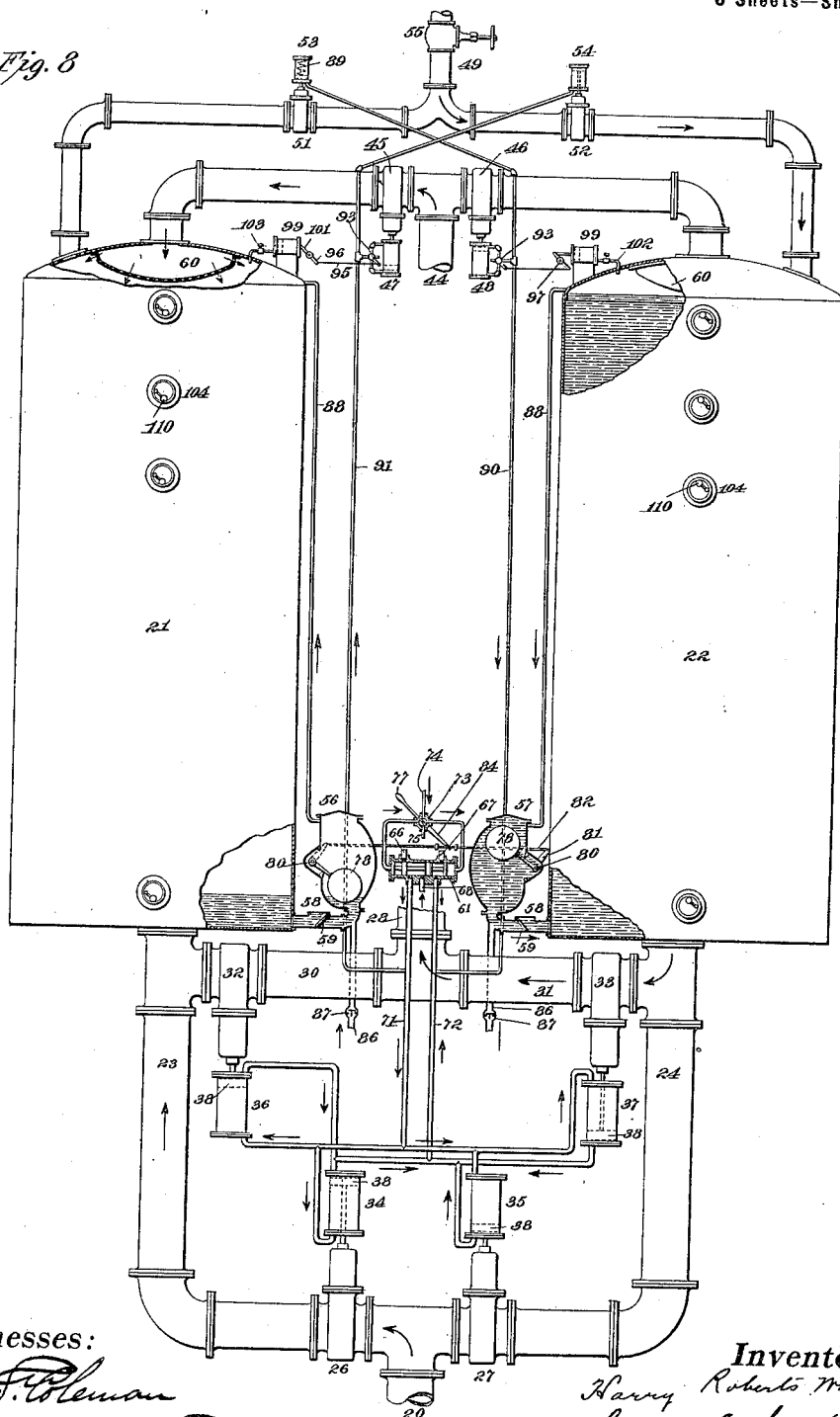

No. 672,247. Patented Apr. 16, 1901.
H. R. WHEELER & G. J. MASHEK.
DREDGING APPARATUS.
(Application filed May 14, 1900.)
(No Model.) 6 Sheets—Sheet 1.
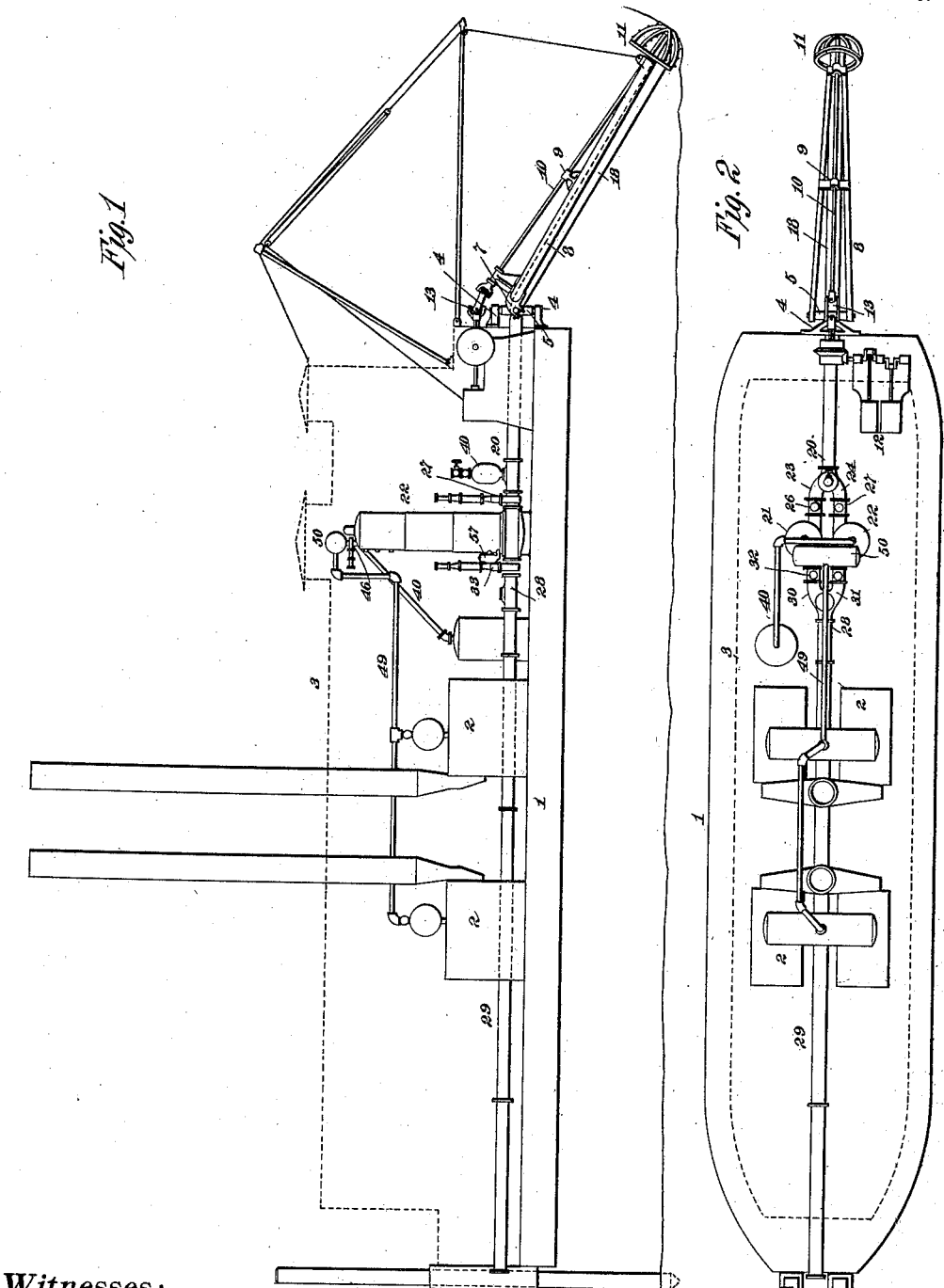
Witnesses:
Inventors No. 672,247. Patented Apr. 16, 1901.
H. R. WHEELER & G. J. MASHEK.
DREDGING APPARATUS.
(Application filed May 14, 1900.)
(No Model.) 6 Sheets—Sheet 2.
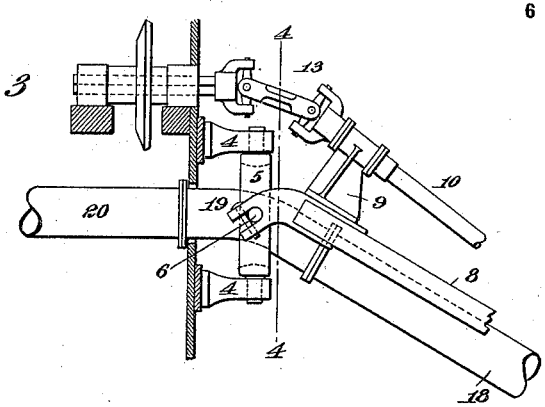
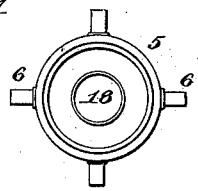
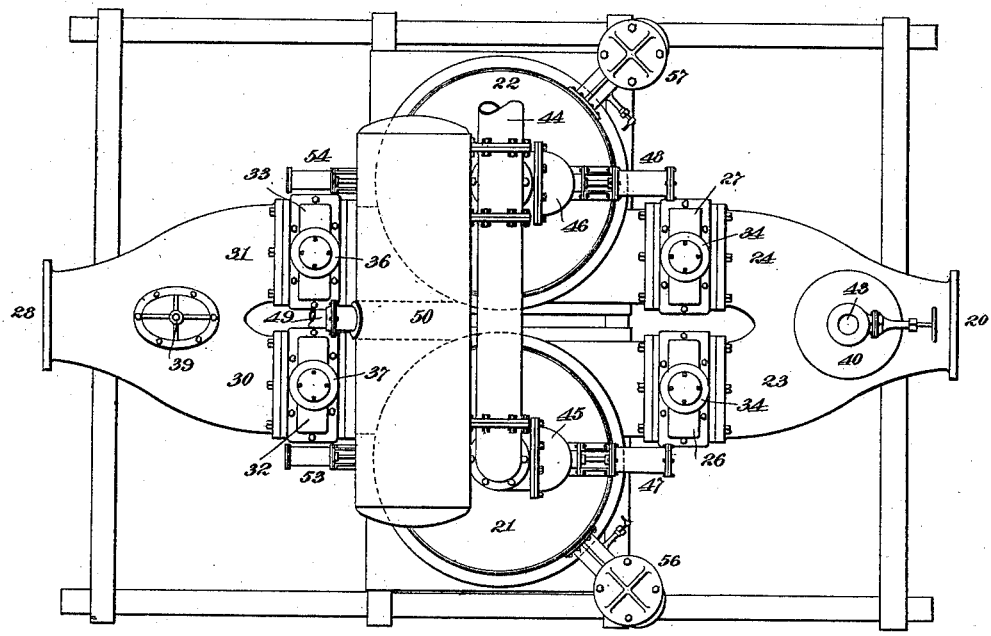

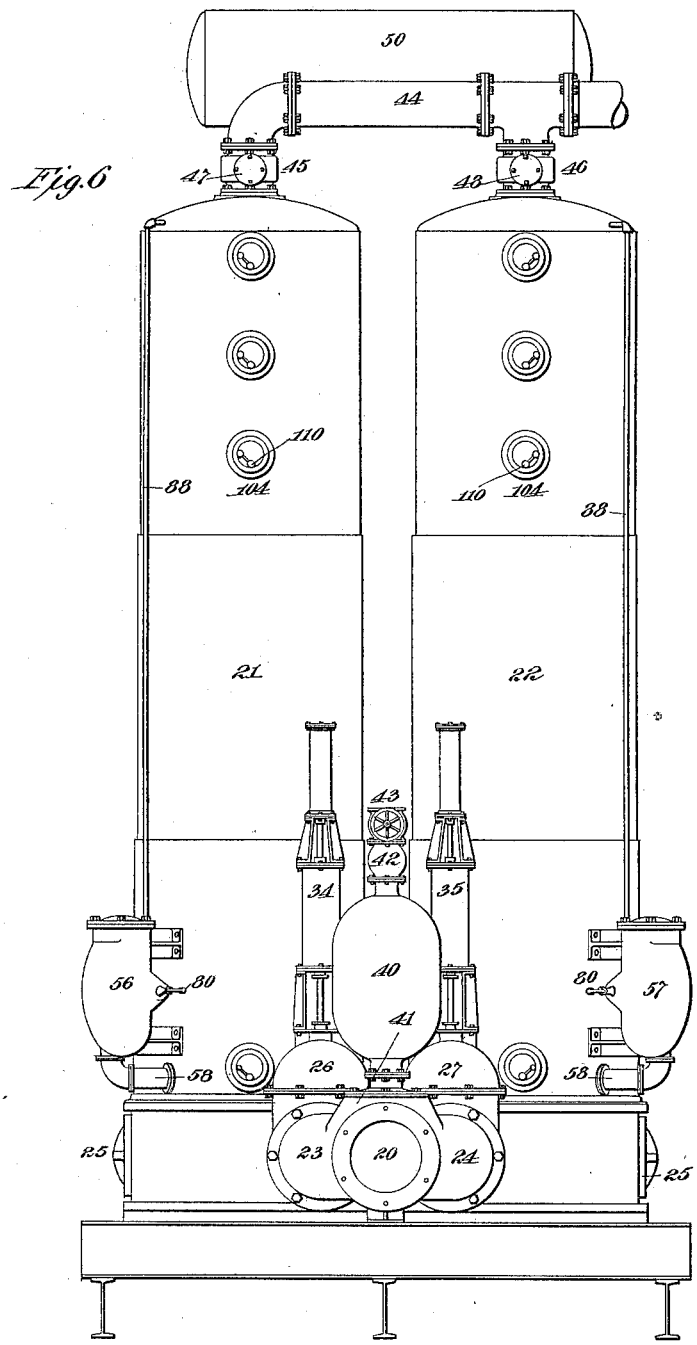

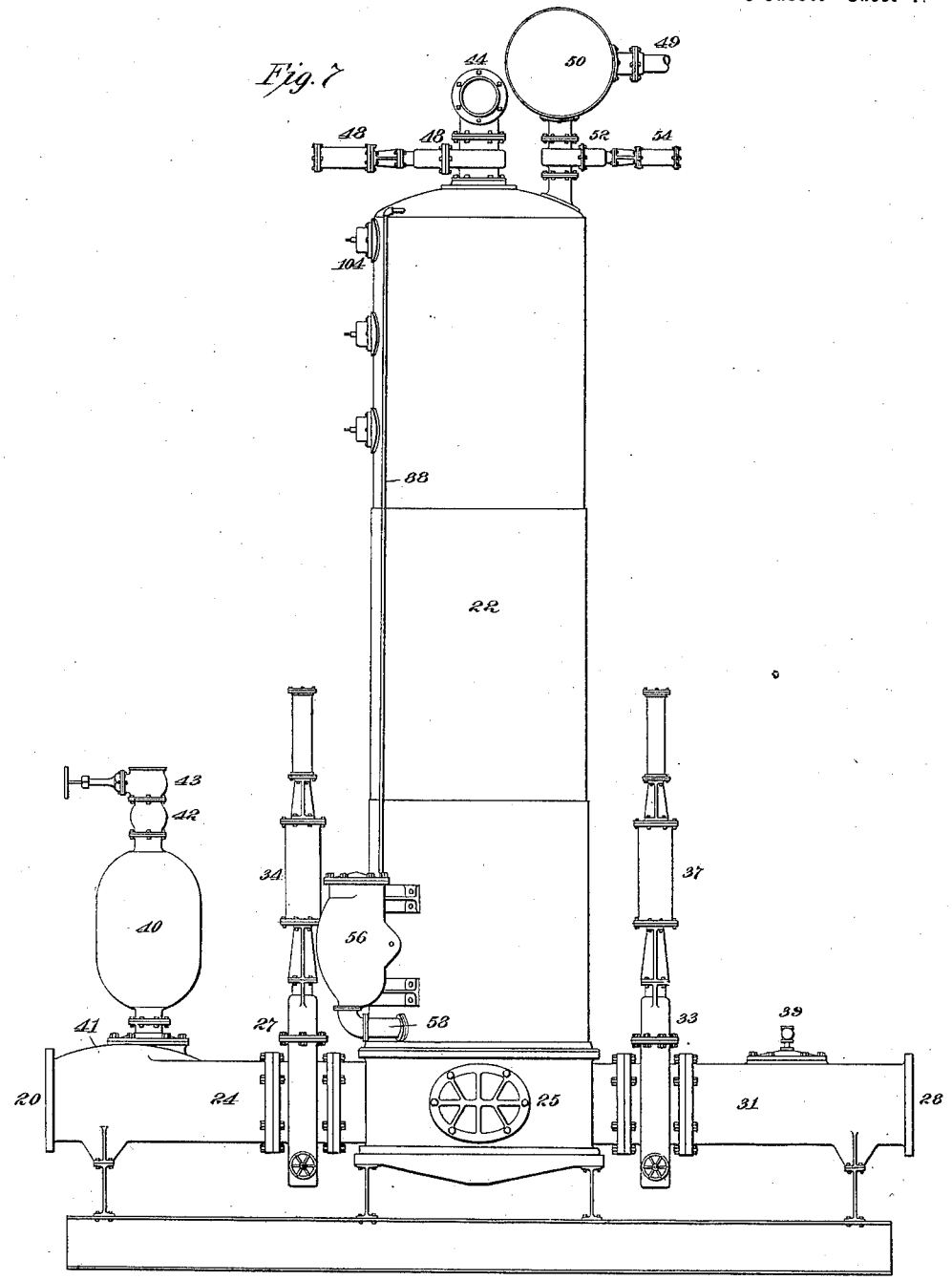

No. 672,247.  
Patented Apr. 16, 1901.  
H. R. WHEELER & G. J. MASHEK.  
DREDGING APPARATUS.  
(Application filed May 14, 1900.)  
(No Model.)  
6 Sheets—Sheet 5.

Witnesses:  
Inventors  
Att'ys.

No. 672,247. Patented Apr. 16, 1901.
H. R. WHEELER & G. J. MASHEK.
DREDGING APPARATUS.
(Application filed May 14, 1900.)
(No Model.) 6 Sheets—Sheet 6.
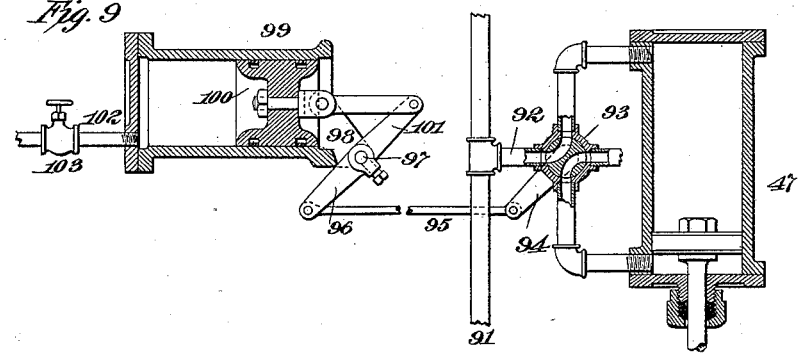
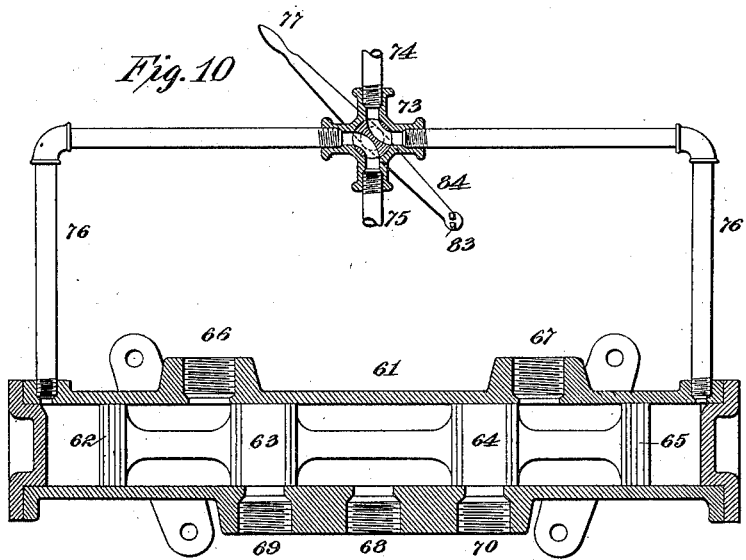

UNITED STATES PATENT OFFICE.

HARRY ROBERTS WHEELER, OF BROOKLYN, NEW YORK, AND GEORGE J. MASHEK, OF NEWARK, NEW JERSEY; SAID MASHEK ASSIGNOR TO SAID WHEELER.

DREDGING APPARATUS.

SPECIFICATION forming part of Letters Patent No. 672,247, dated April 16, 1901.

Application filed May 14, 1900. Serial No. 16,585. (No model.)

*To all whom it may concern:*

Be it known that we, HARRY ROBERTS WHEELER, residing in the borough of Brooklyn, city and State of New York, and GEORGE J. MASHEK, residing at Newark, county of Essex, and State of New Jersey, citizens of the United States, have invented a certain new and useful Improvement in Dredging Apparatus, of which the following is a specification.

Our invention relates to an improvement in dredging apparatus; and our objects are to simplify the construction, improve the efficiency, and increase the capacity of such apparatus.

The dredgers now most extensively used in this country comprise a scow or float carrying a centrifugal pump of great capacity and operated by a separate engine. The suction-pipe of the pump extends obliquely downward from the scow or float, so as to engage with the bottom, and the suction end thereof is provided with a suitable agitating or cutting device to disintegrate and loosen the bottom surface to be removed, said cutter being generally operated by a separate engine. Ordinarily the suction-pipe of the pump is pivoted with respect to the scow or float so as to be capable of being swung back and forth in the desired arc, so that it is now the general practice to connect the suction-pipe with a centrifugal pump by a flexible connection. In some instances, however, the suction-pipe is held stationary with regard to the scow or float and the latter is swung pivotally as a whole with respect to a spud forced down into the bottom, this swinging movement being effected by means of cables passing over blocks secured to anchors or to suitable abutments on the shore, whereby the lower end of the suction-pipe will be moved in the desired arc with respect to the bottom. The material from the centrifugal pump is discharged through discharge-pipes leading to a suitable place of deposit, which may be so far removed from the scow as to necessitate the carrying of the discharge-pipe on separate auxiliary floats. The objections to such apparatus as heretofore used employing centrifugal pumps have been the complications attendant upon the operation of the pump by a separate engine and also the relatively small capacity of the pump. At the present time it is difficult to operate with a centrifugal pump with more than six per cent. of solid material in the stream, while as the resistance to the discharge of the pump increases the lifting capacity thereof is necessarily reduced. Our present invention not only effects a great simplification in the apparatus employed, but also enables us to operate at a maximum depth and to force the material with heavier percentages of solid matter to any desired place of discharge irrespective of the resistance in the discharge-pipe either due to the length thereof or to the height of the final deposit above the water-line.

Broadly stated, our invention comprises a suitable scow or dredge carrying a suction-pipe which engages with the bottom of the river or harbor or other aquatic location, said suction-pipe being movable with respect to the bottom either by being pivotally mounted on the scow or dredge or by pivotally mounting the latter with respect to a stationary spud, a suitable disintegrating or cutting device being employed at the bottom of the suction-pipe to disintegrate, cut, and loosen up the material to be operated upon and two or more vacuum-pumps being employed working in alternation or succession to draw up the material through the suction-pipe and to discharge it to the place of deposit, one of said pumps operating to elevate the material onto the scow or dredge while the material elevated by the other pump is being forced thereby to the place of discharge, whereby an approximately constant load of material will be in continuous transit from the place of removal to the point of deposit.

We are aware that prior to our invention it had been suggested to employ a pair of alternately-operating vacuum-pumps for dredging purposes, the vacuum in each of said pumps being formed by condensing steam therein and the material drawn into the pump by the vacuum being ejected therefrom by steam-pressure, which was subsequently condensed to create the vacuum for the succeeding suction operation. With the prior device, however, the valves controlling the admission and discharge of material to and from the pump, as well as the steam and water supplies, were either operated by hand or by insufficient and impracticable mechanical devices. With such devices as have been before suggested, therefore, no provision was made for preventing an excess of water from being injected into either pump for condensation purposes, and in consequence at each discharge operation an excess of condensing-water required to be forced out of the pumps. If, on the other hand, the supply of condensing-water admitted into the pump was insufficient, only a partial vacuum would be created, so that the capacity would be correspondingly reduced. With such devices, also, no means were employed to prevent the steam-pressure from forcing the material not only out of the pump-cylinders, but to a greater or less extent out through the discharge-pipes, so that there would be a waste of steam and also an intermittent discharge of the material through the discharge-pipe, by reason of which the material therein was not kept in constant movement, as is necessary to secure practical results. For these as well as for other reasons inherent in the devices of this type heretofore suggested it was found impossible to obtain a construction which met with practical success, and therefore such devices were abandoned and have not gone into public use.

In our present invention we make use of an improved construction of double vacuum-pump wherein these objections are entirely overcome, since with our device the supply of condensing-water is cut off as soon as the desired vacuum is reached, whether the vacuum is created slowly or quickly, and with our device the steam-supply for forcing the material out of the vacuum-cylinders is cut off as soon as the complete discharge, or substantially so, of the material from the vacuum-cylinder is secured, followed immediately by the commencement of the discharge from the companion cylinder or from a succeeding cylinder, when more than two are used, whereby the material in the discharge-pipe will be carried in constant and uniform movement, and hence may be moved with a minimum expenditure of power.

A further detail of improvement in our present invention comprises a device employed on the suction-pipe of two or more vacuum or other intermittently-operating pumps as distinguished from a centrifugal pump, wherein there is a continuous suction flow, wherein any air or gas carried by the liquid will be automatically separated therefrom before the liquid enters the pump, and to thereby overcome the loss which would result from that fact.

In carrying out that specific feature of our invention by which we automatically cut off the condensing-water when the desired vacuum is reached we employ in connection with a vacuum-chamber a cylinder connected therewith and having a piston or diaphragm which is moved under the effect of the vacuum to cut off the water-supply, either directly or through the intermediation of a pilot-valve of a pressure-cylinder, the piston of which connects with the water-valve, the passage connecting the cylinder with the vacuum-chamber being preferably provided with a regulating-valve therein by means of which a proper regulation of the movements of the piston in the controlling-cylinder will be secured.

In carrying into effect the specific feature of improvement by which we are enabled to control the steam cut-off and supply to a vacuum-pump by means of a float we employ in connection with a vacuum-chamber a float-chamber containing a fluid therein which operates a shaft extending through the wall of said float-chamber, the latter being connected to the vacuum-chamber at its bottom by a passage and at its top by an equalizing-pipe and the float-chamber being connected to a clear-water supply by a pipe leading therein, suitable provision being made, as by a check-valve, to prevent flow of material from the vacuum-chamber into the float-chamber to the bottom connecting-passage between the two. By means of this construction the creation of a vacuum in the vacuum-chamber results in suction of material to be pumped therein and in suction of clear water into the float-chamber, any excess being carried up through the counterbalancing-pipe and flowing into the vacuum-chamber, whereby the float will be immersed in the clear water. Upon the forcing of the material out of the vacuum-chamber the clear water from the float-chamber will assume the level of the liquid in the vacuum-chamber, flowing out of the float-chamber through the bottom passage and past the check or other form of valve therein, if used, and when the level in the clear water in the float-chamber has dropped sufficiently the float will be actuated to control the cut-off of the steam and the admission of condensing-water.

In carrying out that feature of our invention by which we are enabled to separate from the stream any air or gas carried therein we connect with the suction-pipe, preferably adjacent to the pump or pumps, a chamber carrying an upwardly-opening check-valve, whereby the material drawn up intermittently through the suction-pipe will at each suction movement in being brought to rest act like a hydraulic ram to cause the material to enter the said chamber and to thereby permit the air or gas carried therein to escape through the check-valve.

Other features of construction will be apparent from a detail description of our apparatus and its operation, for which purpose we direct attention to the accompanying drawings, forming a part of this specification, and wherein—

Figure 1 is a side view of a dredging-scow of common form equipped with our present improvements; Fig. 2, a diagrammatic plan thereof; Fig. 3, a side view of the preferred construction of gimbal-joint for the suction-pipe and its supporting and coöperating parts; Fig. 4, a section on the line 4 4 of Fig. 3; Fig. 5, a plan view of our improved vacuum-pumps; Fig. 6, a side view of the same; Fig. 7, an end view; Fig. 8, a diagram of the vacuum-pumps, illustrating the mode of operation thereof; Fig. 9, a detail view illustrating the parts comprising our improved device of cutting off the condensing-water automatically upon the creation of the desired vacuum in the vacuum-chamber; Fig. 10, a detail view of the main controlling-valve for the several cylinders used in connection with the vacuum-pumps, and Fig. 11 a detail view showing the connection between the operating-lever for the pilot-valve of the main controlling-valve and the actuating-rods of the floats.

In all of the above views corresponding parts are represented by the same numerals of reference.

1 represents a suitable scow or float which may be provided with its own propelling mechanism or be towed to the point of use, 2 2 a boiler or boilers (two being shown) carried by the scow, and 3 a suitable housing (indicated by dotted lines) for inclosing the operative parts.

In front of the scow we illustrate a pair of heavy lugs 4 4, in which is mounted a ring 5, so that said ring may turn on a vertical axis. At each side of the ring is a lug 6, with which engages the bracket 7, to which are connected the sides 8 8 of a suitable supporting-ladder for carrying the cutter, its shaft, and the suction-pipe. Mounted in suitable bearings 9 9 in the ladder or frame 8 is a shaft 10, carrying a cutter 11 at its lower end, said shaft being driven in any suitable way—as, for instance, by a small auxiliary engine 12, carried on the scow and connecting the said shaft by a flexible connection 13. The suction-pipe 18 extends through the gimbal-ring 5 and is connected by a flexible section 19 with the suction end 20 of a pair of intermittently-operating vacuum-pumps, the construction of which is more clearly shown in Figs. 5, 6, and 7 and diagrammatically in Fig. 8, the said suction-pumps comprising two or more vacuum-chambers 21 and 22, two of such chambers being shown; but obviously a greater number may be used. Leading into the bottom of each vacuum-chamber is a branch 23 and 24, which connects with the suction-opening 20. At the bottom of each vacuum-chamber we preferably employ a manhole 25 to permit cleaning. A suitable valve 26 opens and closes the branch 23 to the vacuum-chamber 21, and a corresponding valve 27 controls the branch 24. Preferably these valves are gate-valves, which work more effectively in the pumping of water carrying large percentages of solid matter. 28 is the discharge or outlet end from the two chambers, with which the discharge-pipe 29 connects, said discharge-pipe conveying the stream to the place of deposit and being usually carried on floats when the place of deposit is remote from the dredge. A branch 30 leads from the vacuum-chamber 21 to the discharge-opening 28, and a similar branch 31 connects the vacuum-chamber 22 with said discharge-opening. These branches 30 and 31 are controlled by valves, preferably gate-valves, 32 and 33, respectively. The valves 26, 27, 32, and 33 are actuated by pressure-cylinders 34, 35, 36, and 37, respectively, (shown more particularly in the diagram Fig. 8,) the piston 38 of each of these cylinders being connected to the respective valves, whereby the movement of said piston within its cylinder will result in the opening or closing of the valve, as will be understood. The particular pipe connection and operation of these cylinders will be more fully described hereinafter in connection with the diagrammatic view shown in Fig. 8.

Connected with the discharge of the pumps is a valve-pipe 39, which may be opened in starting to permit air to be blown out of the vacuum-chambers, the escape of steam through said pipe indicating when the air has been expelled. Connected to the suction end of the pumps is a gas-separating chamber 40, which preferably is seated upon the bulge or enlargement 41, said chamber being provided with a check-valve 42, opening outwardly, and with a globe-valve 43. When the apparatus is employed in connection with fluids or semifluids carrying air or gas therein, the globe-valve 43 is maintained open. At each suction movement of the stream followed by a momentary arrest thereof the liquid will be forced into the gas-separating chamber 40, as in a hydraulic ram, whereby any gas or air contained therein will be expelled through the check-valve 42, whereby we reduce the proportion of air or gas entering the vacuum-chambers and correspondingly increase the efficiency of the device. When the stream of material acted on does not carry away the gas with it, the globe-valve 43 will be kept closed.

Extending above the vacuum-chambers is a water-pipe 44, supplied with water in any suitable way and having branches leading into the top of the vacuum-chambers, as shown, such branches being controlled by valves 45 and 46, preferably gate-valves, and which are actuated by pressure-cylinders 47 and 48, respectively. Steam is adapted to be intermittently admitted to the vacuum-chambers through the steam-pipe 49, which preferably connects with a steam-drum 50, from which lead pipes to the two vacuum-chambers, said pipes being provided with controlling-valves 51 and 52, the valve 51 being shown only in Fig. 8. These valves are also preferably gate-valves, which are controlled by pressure-cylinders 53 and 54, respectively. The steam-pipe 49 is provided with a controlling-valve 55, (see Fig. 8,) by which the quantity of steam admitted to the apparatus can be regulated. The steam-drum 50 can be dispensed with; but we prefer to use it, since the steam accumulated therein will permit of a more rapid steam-supply to the vacuum-chambers when either steam-valve 51 or 52 is opened than could otherwise be secured. Connected to the vacuum-chambers at their lower ends are the float-chambers 56 and 57, respectively, the pipes 58, which connect said float-chambers with the vacuum-chambers, being preferably provided each with a check-valve 59 therein for preventing the liquid from passing from the vacuum-chambers into the float-chamber, but admitting of flow in the other direction. The check-valves 59 when used are made as light and as easily movable as possible, so as to reduce to a minimum any obstruction of flow of liquid from the float-chamber into the respective vacuum-chambers. Instead of using a check-valve any mechanical equivalent can be adopted for the purpose.

Referring now particularly to Fig. 8, the pipe connections and operation of the parts will appear more clearly, the view being diagrammatic and not representing the elements in the same relation as we show in Figs. 5, 6, and 7. The water-supply entering past the valve 45 or 46, as the case may be, enters the vacuum-chamber at its top and is caused to pass through a perforated plate or rose 60, by which the water will be directed into the chamber in the form of a fine spray, so as to more effectively produce the condensation of the steam. In order to control the admission of steam or other fluid pressure properly to the pressure-cylinders, we employ a main controlling-valve 61, which is more clearly shown in Fig. 10. Said controlling-valve comprises a cylinder carrying the connected pistons 62, 63, 64, and 65 therein. The space between the pistons 62 and 63 connects at all times with an exhaust-port 66, while the space between the pistons 64 and 65 connects at all times with an exhaust-port 67. The space between the pistons 63 and 64 connects at all times with a steam or other pressure inlet pipe 68. By moving the valve to the left in Fig. 10 the steam or other pressure will be admitted to a port 69, while by moving it to the right the pressure will be admitted to a port 70. Connected with the port 69 is a pipe 71, having branches leading to the back of the pressure-cylinders 35 and 36 and to the front of the pressure-cylinders 34 and 37. Connected with the port 70 is a pipe 72, having branches which lead to the back of the cylinders 34 and 37 and to the front of the cylinders 35 and 36. It will be seen that by shifting the valve to the left in Fig. 10 steam or other pressure will be allowed to actuate the cylinders 35 and 36 to close the valves 27 and 32 and to actuate the cylinders 34 and 37 to open the valves 26 and 33, this being the position of the parts shown in Fig. 8, permitting material to enter by suction the vacuum-chamber 21 and allowing material to be forced by pressure from the vacuum-chamber 22, the arrows indicating the flow of such material. Upon moving the valve to the other side the reverse operations take place, the closed valves being opened and the open valves being closed. We can operate the valve 61 in any suitable way; but for convenience we prefer to operate said valve by means of a small pilot-valve 73, as shown in Fig. 8, said valve being of the ordinary four-way type. A pressure-supply pipe 74 leads to the casing of the valve, and an exhaust-pipe 75 leads from said casing. The ends of the cylinder of the valve 61 are connected with the pilot-valve casing by pipes 76, whereby by moving said pilot-valve in one direction fluid-pressure from the pressure-pipe will enter the casing of the valve 61 to engage the piston 62 or 65, while by moving the pilot-valve in the other direction the reverse operation will take place, as will be obvious. The pilot-valve 73 is provided with a handle 77, by which it may be operated by hand, if desired. We prefer to effect an automatic operation of the pilot-valve, when the device is properly operating, by means of floats carried in the float-chambers 56 and 57. 78 is the float mounted in the float-chamber 56, and 79 is the other float, both of said floats being carried on horizontal shafts 80, extending through the walls of the float-chambers and provided with arms 81 at their ends, to which are connected the actuating-rods 82. (Shown more clearly in Fig. 8.) Each of these actuating-rods passes through a fork 83, carried on a lever 84, which is secured to the pilot-valve 73, and each of the actuating-rods 82 is provided with a collar 85, which is adapted to engage the fork 83 to shift the position of the pilot-valve. It will be obvious that a movement of the actuating-rods 82 away from the fork 83 will not affect the pilot-valve, which will be actuated only by a reverse movement of either of said actuating-rods. In order that the floats and float-chamber may not be brought into contact with the material operated upon, with the objections before indicated, we lead to each of the float-chambers a pipe 86, which connects with a clean-water supply. In the case of a dredge the pipes 86 may extend a few feet below the surface, so that clear water may be always drawn by suction up through the same. Each clear-water pipe is provided with a check-valve 87 to prevent backflow. In order to balance the pressure in the float-chambers, we connect each chamber at its top with the upper end of the corresponding vacuum-chamber by means of a pump-counterbalancing pipe 88, whereby the material of the float-chamber will be subjected to the same vacuum or pressure as its connected vacuum-chamber. It will be obvious that when a vacuum is created in either of the vacuum-chambers to draw material by suction therein clean water will be drawn by suction through the pipe 86 into the attached float-chamber, so that the float will be subjected only to such water, while when pressure is turned into the vacuum-chamber to eject water therefrom the level of the water in the float-chamber will correspond substantially to that of the material in the vacuum-chamber, such flow being permitted past the check-valve 59 and the pipe 58. Should the float-chamber fill with clear water before the vacuum-chamber fills with material, the overflow will pass through the counterbalancing-pipe 88 into the vacuum-chamber without harm, and such overflow, owing to the small bore of such counterbalancing-pipe, will be small. In order to operate the steam-valves 51 and 52 for the two vacuum-chambers, we employ single-acting cylinders 53 54, as explained, each cylinder being provided with a spring 89 above its piston or otherwise connected thereto, so as to tend to normally close the steam-valves. Leading to the front end of the cylinder 53 is a pipe 90, which connects with the pipe 72. A corresponding pipe 91 connects the pressure-pipe 71 with the front end of the cylinder 54. A branch 92 leads from the pipe 91 to a four-way valve 93, which controls the pressure to the cylinder 47, said four-way valve being illustrated more particularly in Fig. 9, showing the valve in its normal position, in which it will be observed the fluid-pressure from the pipe 91 will be allowed to enter the front of the cylinder 47 to open the valve 45. An exactly similar arrangement of four-way valve is adopted in connection with the cylinder 48. The stem of each valve 93 is provided with a lever 94, which connects by a link 95 to an arm 96 on the shaft 97, carried by bracket-arms 98 from a small cylinder 99 for each vacuum-chamber, as shown particularly in Fig. 9. The cylinder 99 is employed for the purpose of cutting off the condensing-water when the desired vacuum has been secured. It carries a piston 100, which connects by an arm 101 to the shaft 97 and is connected at its end by a pipe 102, which opens into the respective vacuum-chambers. The pipe 102 is provided with a valve 103 therein, which may be adjusted to regulate the capacity of said pipe. In Fig. 9 we show the parts comprising this controlling device in their normal positions—i. e., when there is no vacuum in the chamber. In Fig. 8 we show the controlling device for the vacuum-chamber 22 in its normal position and for the vacuum-cylinder 21 in its abnormal position, the assumption being that in the latter chamber a vacuum has been created.

It is desirable in the art to secure an indication of the approximate level of liquid or other material in either vacuum-chamber in order that any interruption in the correct operation can be detected, and, further, to allow of the regulation of steam-pressure within the vacuum-chambers to be so effected as to provide for the proper discharge of the material therefrom. We therefore prefer to use a series of indicators 104, having fingers 110, connected with each vacuum-chamber and extending in preferably a vertical line on the front wall thereof.

The operation of our improved dredging apparatus will be as follows, from which the applicability of our specific details of improvement in other connections will be obvious: The scow or float 1 being moved to the desired point, the cutter 11 is permitted to engage with the bottom or with the vertical side wall, and by the usual cables said cutter is moved in the proper arc in engagement with the bottom to be removed either by being swung pivotally from the gimbal 5 or by swinging the scow or float pivotally with respect to a suitable spud. Power is applied to the shaft 10 to rotate the cutter, whereby the cutting-blades 17 will engage with the material to loosen and disintegrate it and to direct it toward the interior of the cutter adjacent to the lower end of the suction-pipe 18. Material is drawn up by suction through this pipe by the operation of the pumps and directed to the place of discharge. At each suction operation of the alternately-operating pumps the material flowing through the suction-pipe and in through the suction-opening 20 of the pumps will be momentarily brought to rest, as explained, and freed from air or gas by means of the gas-separating chamber 40. Assuming the parts to be in the position shown in Fig. 8, it is to be supposed that a vacuum has been created in the vacuum-cylinder 21 by condensing-water passing through the valve 45 and injected as a spray in said cylinder, such vacuum permitting the piston 100 of the attached cylinder 99 to be moved by atmospheric pressure rearwardly, shifting the position of the four-way valve 93 and permitting the fluid-pressure in the pipe 91 to close the valve 45. The assumption also is that the vacuum-chamber 22 is fully charged with material, the steam is entering said chamber to force the material therefrom, that the suction-valve 26 for the chamber 21 is open, its discharge-valve 32 closed, the suction-valve 27 for the chamber 22 is closed, and its discharge-valve 33 open. The valve 61 and pilot-valve 73 are in the positions indicated, and steam or other fluid is exerting pressure in the directions indicated by the arrows upon the several pipes. The creation of the vacuum in the chamber 21 causes the material from the suction-pipe of the dredge to be drawn into said chamber. The vacuum will also exist in the float-chamber 56, which will be filled with clear water through the clear-water pipe 86, any overflow of clear water passing through the counterbalancing-pipe 88 in the vacuum-chamber. The admission of clear water into the float-chamber 56 leaves the float 78 and withdraws the collar 85 on the corresponding actuating-rod 82 from the fork 83, so as not to affect the position of the pilot-valve. Steam being admitted into the vacuum-chamber 22, past the valve 52, will force the material out of said chamber, past the valve 33, and out through the discharge-pipe. The steam-pressure within the vacuum 22 will be equalized through the counterbalancing-pipe 88 upon the clear water in the float-chamber 57. As the level of the liquid material in the vacuum-chamber falls the level of the clear water in the counterbalancing-pipe 88 or in the float-chamber 57 will correspond substantially therewith, any difference in such levels being due to the slight resistance to the check-valve 59. When the level of the liquid material in the vacuum-chamber 22 has fallen sufficiently to permit of a flow of clear water from the float-chamber 57 into such vacuum-chamber past the valve 59, the float 79 will descend and the collar 85 on the actuating-rod 82 thereof will engage the fork 83 to shift the position of the pilot-valve 73. When the pilot-valve is thus shifted, the valve 61 will be reversed and pressure will be admitted to the pipe 72, while the pipe 71 will be connected with the exhaust. The pressure from the pipe 72 will close the suction-valve 26 and open the discharge-valve 32 of the vacuum-chamber 21, which will be filled with material, and will open the suction-valve 27 and close the discharge-valve 33 of the vacuum-chamber 22, which will be filled with steam. Pressure from the pipe 72 through the branch 90 opens the steam-valve 51 for the vacuum-chamber 21 and opens the water-valve 46 for the vacuum-chamber 22. As soon as the pressure is withdrawn from the pipes 71 and 91 the steam-valve 52 for the vacuum-chamber 22 closes. The injection of condensing-water in the chamber 22 results in the creation of a vacuum therein until such vacuum is sufficient to actuate the controlling-cylinder 99 therefor to move the fourway-valve 93 and to permit pressure from the pipe 90 to close the valve 46. Such vacuum also draws a charge of material into the vacuum-chamber 22 and a supply of clear water into the float-chamber 57, as explained. In the operation of a pair of vacuum-pumps it is desirable to so regulate the suction and discharge that both will be approximately constant, this being effected with our apparatus by regulating the steam-valve 55, by which the flow of material from either vacuum-chamber may be made to substantially correspond to the suction of material therein, the outward and inward flows being indicated by the pointers or fingers 110, as explained. It is, however, not strictly necessary to secure a continuous flow of material from the suction-pipe of the dredge into the vacuum-chambers, since the bulk of material in motion between these points is not very great, and, in fact, a retardation thereof is desirable when the separation of the air or gas therefrom is to be secured, as explained. It is, however, strictly necessary in the operation of the vacuum-pumps in tandem or in alternation to secure a constant uninterrupted continuous flow of material through the discharge-pipe, which may sometimes be several thousand feet in length. If the material within the discharge-pipe were allowed to come to rest and then required to be again set in motion at each pulsation of the pumps, there would be an enormous waste of energy, and there would be no comparison in efficiency between such a device and a centrifugal pump, however objectionable the latter may be in theory.

With our improved device the introduction of steam into one vacuum-chamber is effected by the lowering of the liquid in the other, and there is a period of time in the operation when steam under pressure is forcing material simultaneously from both of the vacuum-chambers—that is to say, when the discharge-valve 32 for the chamber 21 is closed the corresponding valve 33 for the chamber 22 is opening. Since these two valves operate in substantial unison, one being closed while the other is open, the area of the discharge from the two chambers remains approximately the same, so that the volume of the stream is maintained uniform and continuous at all times.

Having now described our invention, what we claim as new, and desire to secure by Letters Patent, is as follows:

1. In a dredging apparatus, the combination with a suitable support, of a suction-pipe carried thereby and arranged to engage a water-covered bottom, two or more vacuum-pumps connected to said suction-pipe and working in succession, means for controlling the operation of said pumps, whereby when material from one has been sufficiently discharged therefrom such discharge will be arrested and the discharge from the other commenced, to thereby effect a continuous discharge of such material, a receptacle leading to a source of clear water and in which the level of clear water is successively elevated and depressed at each suction and discharge operation respectively, and a float in said receptacle actuated by changes in level of the clear water and connected to and actuating said controlling means, whereby the controlling mechanism of the pumps will be unaffected by the dredged material, substantially as set forth.

2. In a dredging apparatus, the combination with a suitable support, of a suction-pipe carried thereby and arranged to engage a water-covered bottom, two or more vacuum-pumps connected to said suction-pipe and working in succession, means for controlling the operation of said pumps, whereby when material from one has been sufficiently discharged therefrom such discharge will be arrested and the discharge from the other commenced, to thereby effect a continuous discharge of such material, a receptacle leading to a source of clear water and in which the level of clear water is successively elevated and depressed at each suction and discharge operation respectively, a float in said receptacle actuated by changes in level of the clear water and connected to and actuating said controlling means, whereby the controlling mechanism of the pumps will be unaffected by the dredged material, and a cutter working adjacent to the lower end of the suction-pipe for disintegrating and loosening the material to be removed, substantially as set forth.

3. In a dredging apparatus, the combination with a suitable support, of a suction-pipe carried thereby and arranged to engage a water-covered bottom, two or more vacuum-pumps connected to said suction-pipe and working in succession, means for controlling the operation of said pumps, whereby when material from one has been sufficiently discharged therefrom such discharge will be arrested and the discharge from the other commenced, to thereby effect a continuous discharge of such material, a receptacle leading to a source of clear water and in which the level of clear water is successively elevated and depressed at each suction and discharge operation respectively, a float in said receptacle actuated by changes in level of the clear water and connected to and actuating said controlling means, whereby the controlling mechanism of the pumps will be unaffected by the dredged material, and a cutter working adjacent to the lower end of the suction-pipe for disintegrating and loosening the material to be removed and directing said material inwardly toward the suction-opening, substantially as set forth.

4. In a dredging apparatus, the combination with a scow or float, of a suction-pipe carried thereby and arranged to engage a water-covered bottom, two or more suction-pumps connected to said suction-pipe and working in succession, means for controlling the operation of said pumps, whereby when material from one has been sufficiently discharged therefrom such discharge will be arrested and the discharge from the other commenced, to thereby effect a continuous discharge of such material, a receptacle leading to a source of clear water and in which the level of clear water is successively elevated and depressed at each suction and discharge operation respectively, and a float in said receptacle actuated by changes in level of the clear water and connected to and actuating said controlling means, whereby the controlling mechanism of the pumps will be unaffected by the dredged material, substantially as set forth.

5. In a dredging apparatus, the combination with a scow or float, of a suction-pipe carried thereby and arranged to engage a water-covered bottom, two or more vacuum-pumps connected to said suction-pipe and working in succession, means for controlling the operation of said pumps, whereby when material from one has been sufficiently discharged therefrom such discharge will be arrested and the discharge from the other commenced, to thereby effect a continuous discharge of such material, a receptacle leading to a source of clear water and in which the level of clear water is successively elevated and depressed at each suction and discharge operation respectively, and a float in said receptacle actuated by changes in level of the clear water and connected to and actuating said controlling means, whereby the controlling mechanism of the pumps will be unaffected by the dredged material, substantially as set forth.

6. In a dredging apparatus, the combination with a scow or float, of a suction-pipe carried thereby and arranged to engage a water-covered bottom, two or more vacuum-pumps connected to said suction-pipe and working in succession, means for controlling the operation of said pumps, whereby when material from one has been sufficiently discharged therefrom such discharge will be arrested and the discharge from the other commenced, to thereby effect a continuous discharge of such material, a receptacle leading to a source of clear water and in which the level of clear water is successively elevated and depressed at each suction and discharge operation respectively, a float in said receptacle actuated by changes in level of the clear water and connected to and actuating said controlling means, whereby the controlling mechanism of the pumps will be unaffected by the dredged material, and a cutter working adjacent to the lower end of the suction-pipe for disintegrating and loosening the material to be removed, substantially as set forth.

7. In a dredging apparatus, the combination with a support and a suction-pipe carried thereby and adapted to substantially engage a water-covered bottom, of a pumping device, having an intermittent suction, carried by the support and connected to said suction-pipe, an air or gas discharge passage connected to the suction-pipe, and a check-valve in said passage, substantially as set forth.

8. In a dredging apparatus, the combination with a support and a suction-pipe carried thereby and adapted to substantially engage a water-covered bottom, of a sucking device, having an intermittent suction, carried by the support and connected with the suction-pipe, an air or gas separating chamber connected to said suction-pipe, a discharge from said chamber, and a check-valve in said discharge, substantially as set forth.

9. In a dredging apparatus, the combination with a support and a suction-pipe carried thereby and adapted to substantially engage a water-covered bottom, of a sucking device, having an intermittent suction, carried by the support and connected with the suction-pipe, an air or gas separating chamber connected to said suction-pipe, a discharge from said chamber, a check-valve in said discharge, and a cut-off valve also in said discharge, substantially as set forth.

10. In a dredging apparatus, the combination with a support and a suction-pipe carried thereby and adapted to substantially engage a water-covered bottom, of a vacuum-pump connected to said suction-pipe, a vertical enlargement in said pipe, an air or gas separating chamber connected to said vertical enlargement, a discharge from said chamber, and a check-valve in said discharge, substantially as set forth.

This specification signed and witnessed this 4th day of May, 1900.

HARRY ROBERTS WHEELER.
GEO. J. MASHEK.

Witnesses:
JNO. R. TAYLOR,
ARCHIBALD G. REESE.